United States Patent [19]

Roots

[11] 4,287,158
[45] Sep. 1, 1981

[54] SUPPORT SYSTEM FOR INTERNAL STRUCTURE IN A HIGH TEMPERATURE VESSEL

[75] Inventor: Philip S. Roots, Godalming, England

[73] Assignee: Van Tongeren U.K. Limited, Godalming, England

[21] Appl. No.: 144,569

[22] Filed: Apr. 28, 1980

[51] Int. Cl.³ .......................... B01J 8/18; F26B 17/10
[52] U.S. Cl. .................................. 422/241; 34/57 R; 55/349; 55/459 R; 248/DIG. 1; 422/147; 422/240; 422/242
[58] Field of Search ............... 422/144, 147, 240, 241, 422/242; 248/DIG. 1; 34/57 R; 55/348, 349, 459 R

[56] References Cited

U.S. PATENT DOCUMENTS

| 2,838,382 | 6/1938 | Ringgenberg | 422/147 |
| 2,904,410 | 9/1959 | Trave | 422/147 |
| 2,985,516 | 5/1961 | Trave et al. | 422/147 |
| 3,083,083 | 3/1963 | Kleiber | 422/147 |
| 3,785,782 | 1/1974 | Cartmell | 422/147 |
| 3,951,629 | 4/1976 | Kalen | 422/242 |
| 3,982,902 | 9/1976 | Lortz | 422/147 |
| 4,101,288 | 7/1978 | Smith et al. | 248/DIG. 1 |

Primary Examiner—Bradley Garris
Attorney, Agent, or Firm—Fleit & Jacobson

[57] ABSTRACT

A plenum chamber for a fluidized catalytic cracking unit has the radially outer wall CdD provided with its upper portion Cd of upwardly divergent form and provided with a thermal insulation, and has its lower portion dD of cylindrical form. The radially inner wall AbB is cylindrical and the floor of the plenum chamber may be either flat or of upwardly convergent conical or spherical form.

8 Claims, 4 Drawing Figures

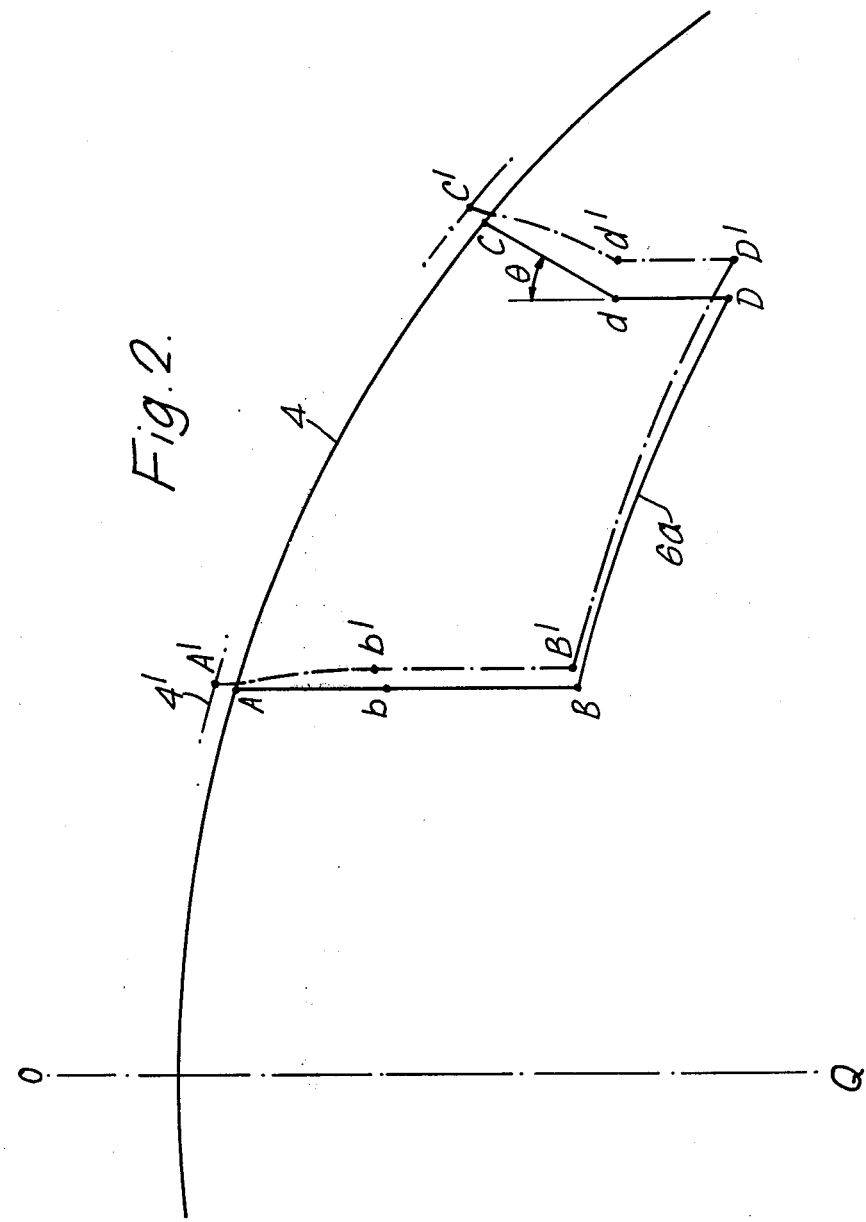

SUPPORT SYSTEM FOR INTERNAL STRUCTURE IN A HIGH TEMPERATURE VESSEL

The present invention relates to a support system for structure to be housed within a high temperature vessel, and in particular to a pressure vessel for use in a fluidised catalytic cracking plant for hydrocarbon fuels.

It is known to provide, within the pressure vessel of a catalytic cracking unit, the cyclone separators for recovery of suspended catalyst particles, and to support the cyclone separators by suspending them from a plenum chamber which is itself located within the pressure vessel and which feeds a gas/particle suspension to the cyclone separators for particle recovery. The plenum chamber is in such cases located just beneath the ceiling of the pressure vessel.

This invention is particularly suitable for situations where the plenum chamber is annular, extending concentrically around the vertical axis of the generally cylindrical pressure vessel, and has the various cyclone separators forming the two or more recovery stages arranged with each stage extending around the annular floor of the plenum chamber.

In use of the plant, the skin of the pressure vessel is subjected to a temperature in the region of 300° F. and the equipment inside the pressure vessel, including the various cyclone separators and connecting ducts, is frequently subjected to temperatures of the order of 1300° F. or more. Furthermore, because of the higher temperature, and the loading forces to be sustained by the internal structure such as the walls and floor of the plenum chamber, they are conventionally made of a stainless grade of steel whereas the walls of the pressure vessel, by virtue of their operating at a lower temperature (made possible by use of heat-insulation linings inside the pressure vessel), can be made of a carbon steel which is cheaper than the stainless steel required for the internal structure. However, this provides a disadvantage in that the differential expansion effect which would in any case occur due to the different temperatures of the internal structure and the shell of the pressure vessel will be exaggerated by the higher thermal expansion coefficient of the stainless steel as compared with that of the carbon steel used for the pressure vessel shell.

The result of this differential expansion of the internal structure such as the walls and floor of the plenum chamber on the one hand, and the skin of the pressure vessel on the other hand, is that while the horizontal floor of the plenum chamber expands peripherally (in other words moving any particular point on the floor of the plenum chamber away from the vertical axis of symmetry of the cylindrical pressure vessel), and the walls of the plenum chamber expand vertically, (dropping the floor of the plenum chamber below its original position) the skin of the non-horizontal ceiling of the pressure vessel expands both radially and upwardly, but by a smaller amount, and consequently the horizontal floor of the plenum chamber departs from its initial horizontal configuration and exerts a bending moment on the various cyclone separators supported thereby. Although the structure connecting the bottoms of the various cyclone separators itself expands, there is insufficient capacity to take up the strains imposed on the neck at the top of each cyclone separator and consequently the neck becomes flexurally strained.

In accordance with the present invention, we provide a pressure vessel having a non-horizontal ceiling supporting an annular plenum chamber within the pressure vessel, and a plurality of cyclone separators suspended from the annular floor of a plenum chamber, the plenum chamber having radially inner and outer walls connecting its annular floor to the ceiling of the pressure vessel such that the radially inner wall and/or the radially outer wall of the plenum chamber is at least partially of a divergent configuration to compensate for differential radial and axial expansions of the plenum chamber walls and floor and of the vessel ceiling.

The invention also provides a cylindrical pressure vessel having a non-horizontal ceiling supporting an annular plenum chamber within the pressure vessel, and a plurality of cyclone separators suspended from the annular floor of the annular plenum chamber, wherein the annular plenum chamber includes radially inner and outer walls which connect the said annular floor to the non-horizontal ceiling and seal off the interior of the plenum chamber from the rest of the interior of the pressure vessel surrounding the plenum chamber, wherein the radially outer wall of the plenum chamber has at least a part thereof of upwardly divergent form to compensate for the differential expansion of the plenum chamber walls and floor and the vessel ceiling when the interior of the vessel is subjected to a temperature higher than the exterior.

Following this general design principle, (a) the coefficients of expansion of the materials used for the ceiling of the pressure vessel and the floor and walls of the plenum chamber, (b) the dimensions of the walls and floor of the plenum chamber, (c) the direction and extent of the inclined part (or the whole) of the plenum chamber wall and (d) the orientation of the plenum chamber floor can be chosen so as to result in the orientation of the plenum chamber floor (when viewed in vertical cross-section) remaining constant, despite downward and radially outward shifting of the plenum chamber floor due to expansion of the floor and walls. This has the advantage that although the cyclone separators will shift outwardly and downwardly upon heating of the pressure vessel and its internal equipment to working temperature, the structure interconnecting the cyclone separators at their lower ends can be arranged to expand by a similar amount and consequently there will be no flexural stress imposed upon the cyclone separator necks as a result of differential expansion.

Although, as indicated above, the coefficients of expansion of the materials used for the ceiling of the pressure vessel and the structure of the plenum chamber are important to the design principle, the main problem arises because of the use of a relatively cool non-flat ceiling in a high temperature environment.

In order that the present invention may more readily be understood the following description is given, merely by way of example, with reference to the accompanying drawings in which:

FIG. 2 is a schematic sectional view similar to FIG. 1 but showing a modified design of the plenum chamber, in accordance with the present invention;

FIG. 1 shows a detailed sectional view, in schematic form, of the domed ceiling 1 of a catalyst regenerator pressure vessel of fluid catalytic cracking plant for the reduction of heavy hydrocarbon oils to lighter products. The vessel as a whole is of generally cylindrical form having a conical floor, and the domed top of which a part is shown in FIG. 1.

Figure 1:
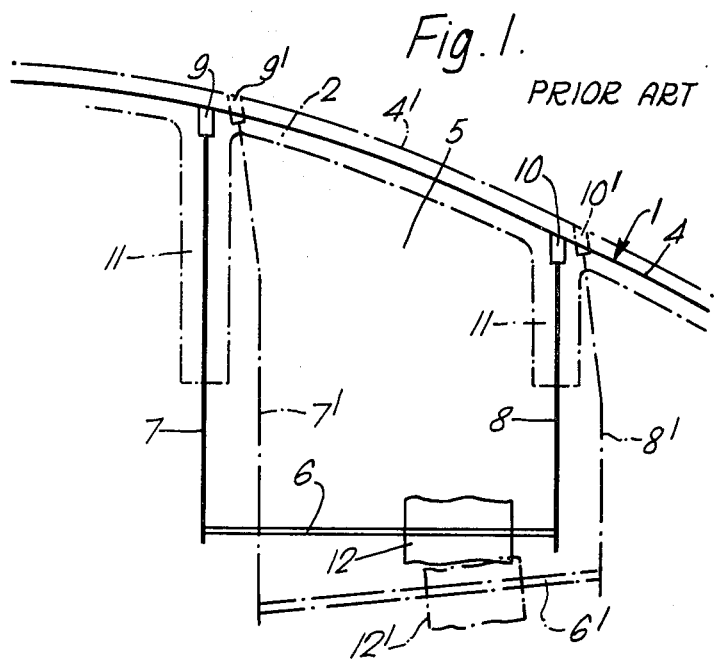
FIG. 1 shows a typical prior art arrangement for the construction of an annular plenum chamber immediately beneath the domed ceiling of a pressure vessel for use in catalytic cracking of hydrocarbon fuels.

The inner surface of the steel ceiling is lined with a heat-insulating layer 2 of refractory concrete which ensures that the steel skin 4 of the ceiling 1 is not subjected to the full process temperature of 704° C. prevailing inside the pressure vessel, but is instead at some lower temperature (in this case of the order of 149° C.).

The plenum chamber 5 is bounded at its top by the inner thermal insulating material 2, conforming to the domed shape of the ceiling 1, and at its bottom by a horizontal annular floor 6 supported, on its radially inner side, by a cylindrical inner wall 7 and, at its radially outer side, by a cylindrical outer wall 8. Flanges 9 and 10, respectively, support the radially inner and radially outer walls 7 and 8 of the plenum chamber, and furthermore each of these walls is lined both radially inwardly and radially outwardly, over the upper part of its extent with more heat-insulating refractory concrete 11. The plenum chamber walls 7 and 8 and floor 6 are formed of 304 H stainless steel and form the load bearing structure for equipment within the pressure vessel by direct connection to the ceiling 1.

Chain dotted lines in FIG. 1 show the displaced positions 6', 7' and 8', respectively of the floor, inner wall and outer wall of the plenum chamber at working temperature or "hot". From this it will be appreciated that the solid line positions of the floor 6, radially inner wall 7 and radially outer wall 8 are representative of the condition when the plant is shut down or "cold". The chain dotted line configurations are shown in an exaggerated form in order to illustrate the action of the relatively small deformations to which these components are subjected.

Expansion of the ceiling 1 in the radial and peripheral directions results in movement of the flanges 9 and 10 to displaced positions 9' and 10', respectively, and consequently the part of the ceiling which defines the top wall of the plenum chamber 5 tends to shift radially outwardly to a deformed position 4'. At the same time, the horizontal floor 6 will itself expand radially and peripherally and, because of its higher temperature and of its construction from stainless steel having a coefficient of expansion higher than that of the carbon steel used for the skin 4, it will expand to a greater extent, thereby resulting in inclination of the "hot" positions of the radially inner and outer walls 7' and 8', respectively.

Simultaneously, the radially inner wall 7 and the radially outer wall 8 will expand in length according to the higher temperature existing inside the vessel, but the outer wall 8 changes in position relative to the inner wall 7 by virtue of the amount of expansion of the relatively cool vessel portion between the points 9 and 10 (having a vertical projection which is subject to expansion). The effect of this positional change is to cause the plenum chamber floor 6 to adopt a distorted (in this case downwardly tapering, frusto-conical) form 6' when hot. In this example, the relative positional change of the whole of the radially outer wall 8 relative to the whole of the radially inner wall 7 is 1.6 cm.

The neck 12 of one of the many cyclone separators, forming the equipment within the pressure vessel to be supported by the floor 6 of the plenum chamber, is shown in FIG. 1 as being initially vertical in the "cold" configuration. The "hot" configuration 12' of the same neck is shown in chain dotted lines, and from this it will be appreciated that the neck of the cyclone separator has moved radially outwardly (as would be expected in view of the peripheral and radial expansion of the floor 6), but also that an inclination of the floor 6' in the "hot" position (resulting from the difference in the depths of the radially and inner walls 7 and 8 joining the previously horizontal floor 6 to the domed ceiling 1 and of the ceiling distortion) has resulted in an inclination of the "hot" position of the neck 12', with resulting flexural stressing of the cyclone separator.

Although the lower parts of the various cyclone separators are interconnected, and possibly also offered some support, by structure including ducting at the bottom of the pressure vessel, the expansion which can be expected of this structure, and also the need for interconnection of the product outlets of the various cyclone separators, is incapable of accommodating the amount of radially outward shift which would be required in view of the combined tilting and lateral shift of the "hot" position of the neck 12' and consequently the cyclone separators are subjected to considerable strain which requires strengthening of the necks 12 involving cost penalties resulting from additional expensive stainless steel material, and additional labour.

The configuration shown in FIG. 1 is that which would be adopted by the average designer in this art when faced with the problem of providing an annular plenum chamber whose floor supports the various cyclone separators.

It should be appreciated that the stressing to which the structure shown in cross-section in FIG. 1 is to be subjected is considerable in that in the plant typified in FIG. 1, there will be five first stage cyclones supported directly by the radially inner plenum chamber wall 7, a circular array of five second stage cyclones supported by the plenum chamber floor 6 near its junction with the radially inner wall 7 (but equiangularly spaced at 72° intervals around the vertical axis of the cylindrical pressure vessel) and also twenty first stage cyclones supported by the radially outer wall 8 and a circular array of twenty second stage cyclones supported by the floor 6 near its junction with the radially outer wall 8. Since each of the second stage cyclones weighs 7,670 Kg and each first stage cyclone weighs 10,670 Kg, considerable load forces will in this case be exerted on the walls 7 and 8 of the plenum chamber and to the ceiling 1 of the pressure vessel.

Referring now to FIG. 2, there will be seen, in schematic form, both the "cold" configuration ABDC and the "hot" configuration A'B'D'C' of a modified design of plenum chamber designed in accordance with the present invention.

Again, the ceiling 1 of the pressure vessel is domed with the skin 4 at substantially the same radius of curvature as in FIG. 1, and also in this case the "cold" configuration of the radially inner wall AB is vertical. However, in this case the radially outer wall has the upper, thermally insulated part Cd of conical upwardly divergent form and the lower uninsulated part dD vertical. It is envisaged that radially inner walls of other than vertical configuration when viewed in a diametral cross-section through the plenum chamber (i.e. walls of other than cylindrical form when considered in relation to the pressure vessel as a whole) may be used if this is required for any special application. Equally a divergent radially outer wall of any configuration other than that shown, for example one where the entire wall height CD is divergent, or one where the divergent part is not truly conical, can be used.

In FIG. 2 the shaping of the floor 6a of the plenum chamber is again annular, but now non-horizontal, and can be considered as generally conforming to a domed configuration which is not very different from the domed configuration of the skin 4 of the ceiling 1. It is, however, envisaged that the floor 6a could instead be conical (i.e. rectilinear as viewed in the cross-section shown in FIG. 2) or may have any other inclined form with the cross-sectional view through the plenum chamber, such that, as in FIG. 2, the upper end of the top wall of the plenum chamber (the part of the annular area of the ceiling skin 4 between the inner and outer flanges 9 and 10) is generally above the upper end of the inclined floor 6a, and the lower end of the upper wall is similarly generally above the lower end of the floor 6a. Alternatively a flat floor, such as that shown in FIG. 3, may be provided.

In the FIG. 2 embodiment of the present invention, the conicity of the upper part of the radially outer wall CdD acts as a mechanism to produce a downward movement of all the lower part dD of the radially outer wall CdD. This movement compensates for the lower rate of expansion in the vertical distance AC, and preserves the vertical positional relationship between the radially inner wall and the radially outer wall and thus a constancy of the inclination of the line BD with respect to the axis OQ during movement from the cold state BD, to the hot state B'D'.

In terms of the stressing on the neck 12 of each cyclone separator, the important aspect is that the inclination of the neck will remain the same (in this case vertical although the neck itself is not illustrated in FIG. 2) and consequently the pure lateral shifting of the upper ends of the cyclone separators can be matched by the expansion of the couplings at the lower ends of the cyclone separators.

Figure 4:
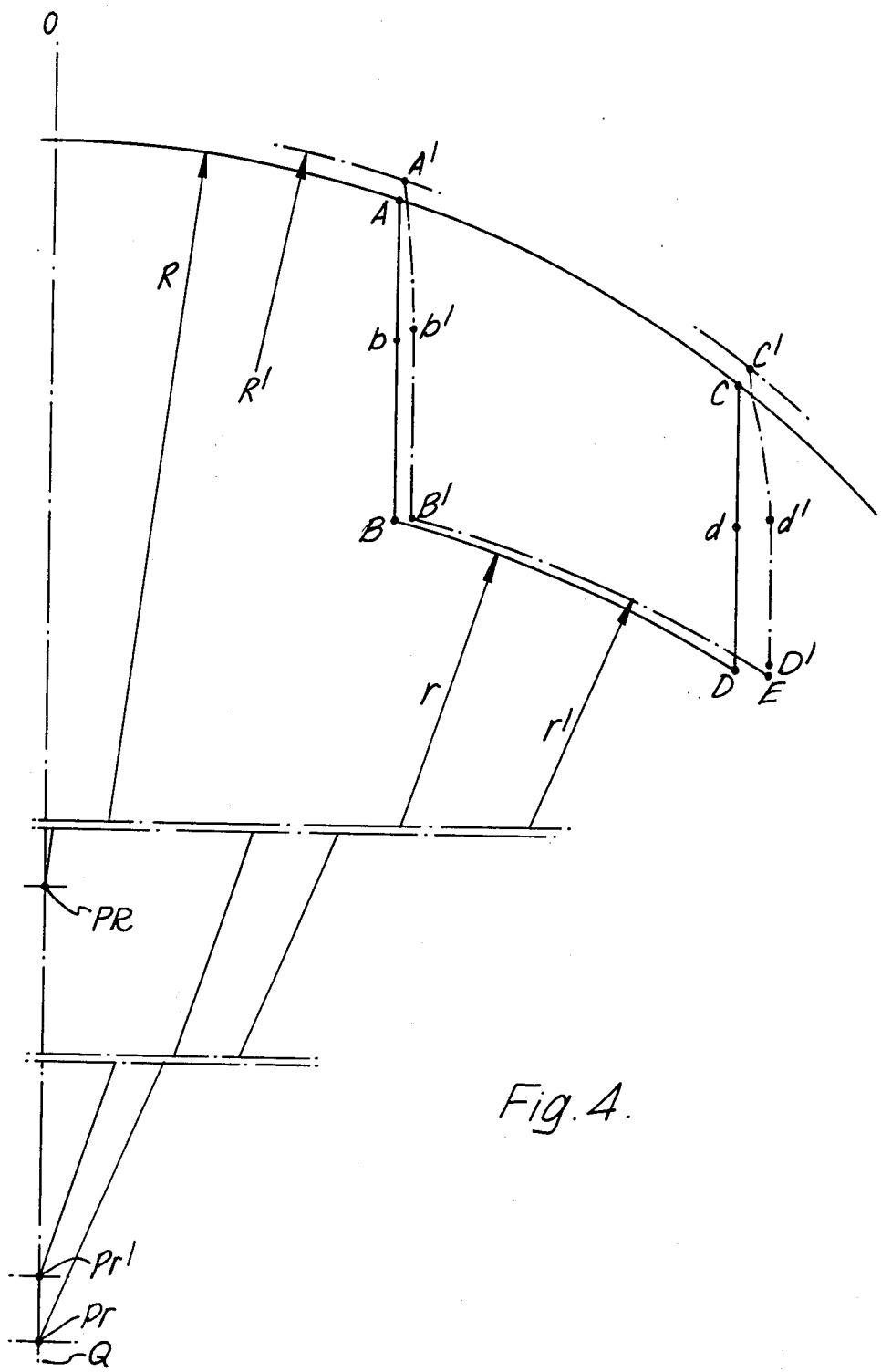
FIG. 4 is a schematic sectional view of a partially compensated plenum chamber showing the mis-match which can be eliminated in the design according to the present invention.

In order to provide an illustration of the method of compensation for differences in thermal expansion, based on conditions typically found in modern Fluidised Catalytic Cracking regenerators, we now refer to FIG. 4 which shows a partially compensating plenum chamber design but with a resulting mis-match which is to be eliminated by adoption of the design in accordance with the present invention.

The thermal expansion problems associated with the plenum chamber for the cyclone separators in a fluidised catalytic cracking regenerating vessel have been discussed generally above. When considered in more detail, they can be seen to fall into two categories:

(1) Those brought about by expansion radial to the vertical axis of the vessel and giving rise to stresses which are a function of thickness, modulus and expansion coefficient of the material, the radius from the axis, and the rate of change of temperature along the plenum wall between the joint with the vessel and the location where it equalises with the gas temperature.

(2) Those caused by expansion vertically (parallel to the vessel axis) and which, if not corrected, would tend to alter the geometry of all that part of the plenum which is equal in temperature to that of the gas.

The acceptability of the first category will depend on the levels of stress and the expected life. The second category must be eliminated as far as possible in order to reduce the risk of failure which could lead to a serious reduction in separating efficiency.

Such failure would be the development of cracks in plates and welds giving rise to leak paths for catalyst laden gas through the cyclone structure or direct into the plenum chamber.

Referring to FIG. 4, the cold positions of particular points are denoted by A, B, b, C etc, and the hot positions by A', B', b', C', etc. The vertical axis of the vessel is OQ and R denotes the radius of the hemispherical head of the vessel struck about a point PR which, for convenience, is assumed to be the fixed point of reference. The upper portions Ab and Cd of the plenum walls are insulated, and the lower portions b'B' and d'D' are assumed to be at the same temperature as the gas at the hot normal operating condition.

The bottom of the plenum is shown as spherical in form and of radius r when cold, and as the centre PR of the vessel head is assumed fixed in position the centre Pr of the plenum bottom will, in the hot condition, move down to Pr'. The following conditions need to be fulfilled in order to prevent a change in geometry other than of scale resulting from free expansion.

The triangles d Pr b and D Pr B must be congruent with d' Pr' b' and D' Pr' B' respectively, and the angular coordinates of the various points b, B, d and D with respect to Pr' O must be identical with those of b', B', d' and D' with respect to Pr' O. To satisfy these conditions the part of the plenum bounded by b B D d must not be restrained from free expansion about its axis of symmetry OQ.

In each wall, however, there is an insulated length Ab and Cd which reduces the overall rate of expansion of the distance AB and CD. In the outer wall there is also a vertical distance, AC, where the rate of expansion is governed by the material and the lower temperature of the shell material.

The effect of these lower rates of expansion is that D', instead of remaining on the line given by radius r' struck through B', is some distance above it, namely E D'.

To correct this mis-match it is first necessary to determine the temperature distributions along each insulated portion of plenum wall and the vessel wall from the centre of the joint between it and the outer plenum wall. The effective lengths A'b' and C'd', and the positions A' and C' are then calculated from these distributions, and so in turn is the amount of the mis-match ED'.

The required correction is obtained by making a wall, or insulated part of a wall, conical in shape.

In FIG. 2, the conicity angle $\theta$ of the insulated portion Cd is chosen such that point d has effectively moved on an arc downwards to d' while changing its radius from the vessel axis d OQ cold to d' OQ hot. This downward movement is the amount necessary for the change in height BD to B'D' to take place in accordance with the condition of free expansion of all the non-insulated part of the plenum walls (below b and d).

The floor BD of the plenum in FIGS. 2 and 4 is spherical.

Figure 3:
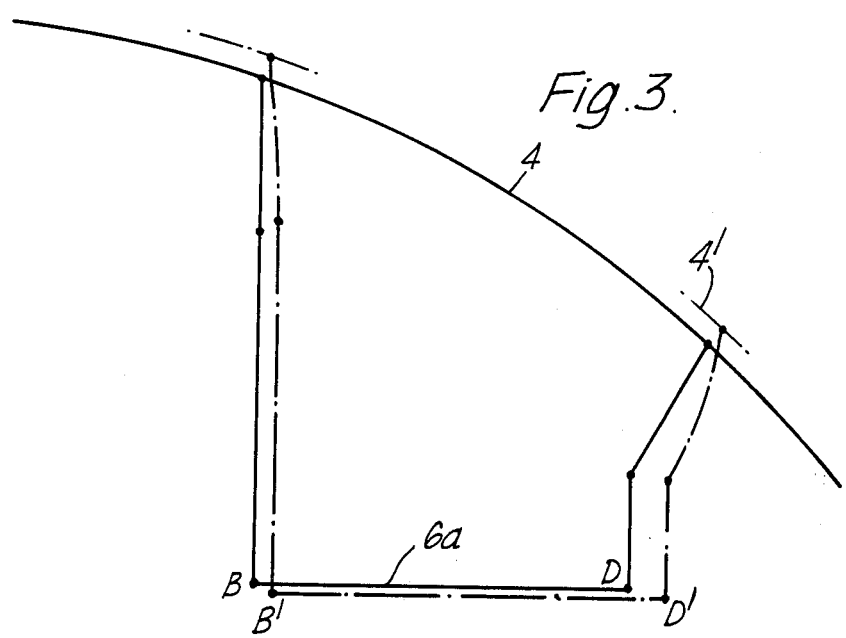
FIG. 3 is a view similar to FIG. 2, but showing a further embodiment of this invention.

If other forms are employed e.g. conical or horizontally flat, the condition for free expansion remains the same. When the plenum walls are fully expanded, the angle which a line through points B' and D' makes with the vessel axis will be identical to the corresponding angle of points B and D in the cold position. FIG. 3 shows schematically a flat-floored form of annular plenum chamber designed in accordance with the present invention.

It is not essential, for the present invention, that the radially inner and outer walls 7 and 8 of the plenum chamber be made of the same material, or that the floor 6 of the plenum chamber be also made of that same material; nor is it necessary that, when these three walls are made of the same material, the material should be stainless steel. The important consideration is that, given a domed or conical ceiling 1 (generally a ceiling of non-horizontal form) the radially inner and/or outer walls will be at least partly divergent with respect to the vessel axis. The floor 6a will itself preferably be non-horizontal, e.g. of domed or horizontal form with the upper ends of the plenum chamber floor, and of the pressure vessel ceiling thereabove, generally one above another.

Similarly, the material chosen for the ceiling 1 of the pressure vessel, in this case carbon steel, is not critical, provided the differential displacement of the junctions A and C of the radially inner and outer walls of the plenum chamber (resulting from the expansion of the domed or other non-horizontal configuration ceiling 1) is matched to the asymmetric vertical shift of the bottoms B and D of the radially inner and outer walls to maintain the desired constant angular orientation of the floor 6a as viewed on a longitudinal cross-section with respect to the vessel.

As indicated above, the floor 6a need not be domed but may, for example, be of conical form, and from this it will be appreciated that the use of the term "inclination" with regard to the floor 6a is intended to denote the straight line joining, on the one hand the junction B of the radially inner wall AbB with the radially inner part of the floor BD as viewed in FIG. 2, and on the other hand the junction C of the radially outer wall CdD with the radially outer part of the floor BD as viewed in FIG. 2.

Similarly, it is not essential for the layer heat-insulating material 2 to be included on the ceiling 1 or for the heat-insulating material 11 to be incorporated on the radially inner and outer walls, but without such a lining the material used for the skin 4 and the radially inner and outer walls would need to be resistant to heat to a much greater extent that in the FIG. 2 embodiment. However, in the absence of such insulating material, the high temperature region bB and dD, respectively, of each of the vertical walls AbB and CdD of the plenum chamber will extend further along the walls (it being understood that in the insulated forms of the walls shown in FIGS. 2 and 3 there are, in the upper end concealed by the insulating material 11, portions of reducing temperature gradient).

Although in the preferred embodiment of the present invention, illustrated in FIG. 2, the divergent portion Cd of the radially outer wall coincides with the extent of the refractory concrete-insulated part of that wall, it is of course conceivable for the divergent portion to be of greater or of lesser extent, provided the overall equilibrium of the structure, upon expansion from its "cold" configuration to its "hot" normal running configuration, is retained.

The preferred embodiments of the present invention disclosed in the present application are intended for environments where the interior of the vessel 1 is hotter than the exterior. The expert in this art will readily appreciate that where the inverse relationship prevails, it is possible to adapt the design in accordance with the present invention for compensating for the asymmetric stresses which may arise.

The advantages of the at least partially divergent configuration of the radially inner and/or outer plenum wall according to the present invention are that, by a relatively simple modification to the shape of the plenum chamber wall, the design of the cyclone separator necks 12, and their installation, has been simplified and the need for any much more complex internal distortion-avoiding support structure has been avoided.

I claim:

1. A pressure vessel having a vertical axis of symmetry; and further including:
 (a) a ceiling of non-horizontal form to said pressure vessel;
 (b) means defining an annular plenum chamber within the pressure vessel, adjacent said ceiling, said annular plenum chamber comprising an annular floor having inner and outer perimeters, inner and outer walls symmetrical about said axis of the pressure vessel, means joining said inner wall to the inner perimeter of said floor and to said ceiling, and means joining said outer wall to the outer perimeter of said floor and to said ceiling;
 (c) a plurality of cyclone separators and
 (d) means suspending said cyclone separators from the annular floor of said plenum chamber wherein
 (e) at least one of said radially inner wall and said radially outer wall of the plenum chamber includes means defining a wall portion of a divergent configuration with respect to the said axis, said divergent portion being dimensioned to compensate for differential radial and axial expansions of the said inner and outer plenum chamber walls and said annular floor of the plenum chamber and of said ceiling of the pressure vessel.

2. A pressure vessel of vertical cylindrical form having:
 (a) a ceiling of non-horizontal form;
 (b) an annular plenum chamber within the pressure vessel and adjacent said ceiling, said annular plenum chamber having an annular floor with circular radially inner and outer perimeters concentric to said pressure vessel, a radially inner cylindrical wall, a radially outer wall, means joining said radially inner cylindrical wall to said radially inner circular perimeter of said annular floor and to said ceiling, and means joining said radially outer wall to said radially outer circular perimeter of said floor and to said ceiling, said annular plenum chamber thereby being sealed off from the rest of the interior of the pressure vessel surrounding the plenum chamber;
 (c) a plurality of cyclone separators within said pressure vessel; and
 (d) means suspending said cyclone separators from the annular floor of the annular plenum chamber;
 (e) wherein said radially outer wall of the plenum chamber has a part of upwardly divergent form dimensioned to compensate for differential expansion of said radially inner cylindrical wall and radially outer wall of the plenum chamber and said annular floor of the plenum chamber and said ceiling of the pressure vessel when the interior of the vessel is subjected to a temperature higher than the exterior.

3. A pressure vessel according to claim 2, wherein said radially outer wall has said divergent part at its top and further includes a lower part which is cylindrical.

4. A pressure vessel according to claim 3, and including thermally-insulating lining means on the interior of the ceiling of the pressure vessel, and on at least an upwardly disposed portion of each of the radially inner cylindrical wall and said radially outer plenum chamber wall, and wherein said upwardly divergent part of the radially outer plenum chamber wall coincides with said upwardly disposed portion having the thermally-insulating lining.

5. A pressure vessel according to claim 3, wherein said upwardly divergent part of the radially outer wall of the plenum chamber is conical.

6. A pressure vessel according to any one of claims 2 to 5, wherein said annular floor of the plenum chamber is of upwardly convergent form such that said radially inner circular perimeter of the plenum chamber floor is higher than said radially outer circular perimeter of the plenum chamber floor.

7. A pressure vessel according to any one of claims 2 to 5, wherein said annular plenum chamber floor is horizontal.

8. A pressure vessel according to any one of claims 2 to 5, wherein said vessel has a skin of carbon steel and said plenum chamber walls and floor are formed of stainless steel.

* * * * *